United States Patent

Skye et al.

[11] Patent Number: 5,357,306
[45] Date of Patent: Oct. 18, 1994

[54] PHOTOGRAPHIC PROCESSING APPARATUS

[75] Inventors: David A. Skye, Harpenden; Leslie J. H. Pummell, Rickmansworth, both of Great Britain

[73] Assignee: Eastman Kodak Company, Rochester, N.Y.

[21] Appl. No.: 952,613
[22] PCT Filed: May 15, 1991
[86] PCT No.: PCT/EP91/00914
 § 371 Date: Nov. 23, 1992
 § 102(e) Date: Nov. 23, 1992
[87] PCT Pub. No.: WO91/18326
 PCT Pub. Date: Nov. 28, 1991

[30] Foreign Application Priority Data

May 23, 1990 [GB] United Kingdom ............... 9011558.5

[51] Int. Cl.$^5$ ................................................ G03D 3/02
[52] U.S. Cl. ..................................... 354/324; 222/58
[58] Field of Search ................ 354/324, 298, 317–323, 354/303, 305; 118/672, 683, 688, 694; 222/58, 63, 375, 541, 440, 52, 57, 132, 135; 137/408

[56] References Cited

U.S. PATENT DOCUMENTS

| | | | |
|---|---|---|---|
| 3,368,472 | 2/1968 | Van Bouwel et al. | 354/298 |
| 3,602,607 | 8/1971 | Hodges | 354/298 |
| 4,012,753 | 3/1977 | Schmidt | 354/298 |
| 4,329,042 | 5/1982 | Libicky et al. | 354/324 |
| 4,466,072 | 8/1984 | Kaufmann | 354/298 |
| 4,605,297 | 8/1986 | Livingston et al. | 354/317 |

FOREIGN PATENT DOCUMENTS 0304093 2/1989 European Pat. Off. .
1088752 10/1967 United Kingdom .

Primary Examiner—D. Rutledge
Attorney, Agent, or Firm—Nixon, Hargrave, Devans & Doyle

[57] ABSTRACT

In photographic processing, the chemistry needs to be replenished periodically in order to produce optimum results. Known replenishment systems utilize replenishers in liquid form which are dispensed according to volume. These systems require the use of a pump which is both accurate and relatively inexpensive. Described herein is a replenishment system which uses a weighing system with a series of intermediate containers to dispense replenishment materials. The system comprises a weighing device which has three intermediate containers supported on it. Each container is connected to its associated processing stage by a pipeline. Flow of replenisher materials from each container is controlled by respective valves which are interfaced with a computer. The computer is also interfaced with the weighing device and monitors the decrement in weight of the intermediate containers so that the exact amount of replenisher materials can be added.

9 Claims, 2 Drawing Sheets

PHOTOGRAPHIC PROCESSING APPARATUS

BACKGROUND OF THE INVENTION

This invention relates to photographic processing apparatus, and is more particularly concerned with replenishment systems for such apparatus.

In photographic processing, the chemicals used for the development, bleaching and fixing stages need to be replenished periodically in order to produce optimum results. The rate at which the chemistry needs to be replenished depends mainly on the area and the exposure of the photographic material being processed. In known replenishment systems, replenishment is generally carried out using chemicals in liquid form and pumping volumetrically metered quantities to the appropriate stage or stages of the processing apparatus as required. Accurate metering pumps can be used to dispense the replenisher in such systems, but these tend to be very expensive. A cheaper alternative to the metering pump is a bellows pump which is not very accurate, especially when only small quantities of replenishment material need to be added.

U.S. Pat. No. 4,605,297 discloses an arrangement in which a peristaltic pump is used to dispense fluid from a bottle during the processing of photographic film material. The pump also operates to return the excess fluid from the film surface to the bottle after use. A weight sensor is used to determine the amount of fluid in the bottle. The weight sensor is not used to meter fluid from the bottle but only to determine if there is sufficient fluid in the bottle for a processing operation before it is started. However, this type of arrangement tends to be inaccurate as there is no allowance made for any fluid which is retained in pipework connecting the bottle to its dispensing station.

Another problem associated with pump-based replenishment systems is that air can be trapped in the system causing air locks. As a consequence, when a certain volume is pumped through the system to effect replenishment, there is no allowance for trapped air and less replenisher material is dispensed than desired.

It has been proposed to use a weighing system for dispensing replenishment materials. However, due to the size of the container in which the replenishment materials are stored, very expensive weighing systems need to be used to be able to dispense replenishment materials to the desired accuracy.

SUMMARY OF THE INVENTION

It is therefore an object of the present invention to provide an accurate, relatively inexpensive weighing system for dispensing replenishment materials in photographic processing apparatus.

According to one aspect of the present invention, there is provided a method of replenishing a photographic process comprising a plurality of different processing stages to maintain component concentration of each stage within specified limits, the method comprising the steps of:

monitoring the amount of material being processed;

determining an amount of replenishment material required to maintain the component concentrations in each stage; and dispensing the required amount of replenishment material to the appropriate stage, characterized in that the amount of replenishment material dispensed to each stage is determined by weighing means, replenishment material for each processing stage being stored and dispensed separately, and in that the amount of replenishment material dispensed each time is replaced prior to dispensing further replenishment material.

By this arrangement, the containers can be permanently installed on the weighing system, and do not need to be handled during replenishment. This reduces the risk of damage to the weighing system when the reservoir containers need to be replaced. Furthermore, reservoir containers of any desired size can be used without needing to recalibrate the weighing system.

Reservoir containers can be fitted with quick-connect type fittings without having to be concerned with the "dead-weight" contribution of the fittings themselves.

The frequency of replacement for reservoir containers can be reduced without sacrificing dispensing accuracy.

Preferably, the weighing system comprises a single weighing device on to which all the intermediate containers are mounted.

Advantageously, the control means includes a computer which controls the dispensing of the replenishment materials, and the weighing system is interfaced with the computer.

The computer may be programmed with software which includes intelligent, self-learning algorithms to control replenishment.

Each intermediate container may be a variable accumulator having tubing connecting it to its associated processing station. In one embodiment, the variable accumulator is a solid container with a rolling diaphragm. Alternatively, the variable accumulator may be a flexible bag, the flexible bag being housed in a rigid outer box or suspended from a lightweight frame. These types of accumulators reduce the amount of air in the system which is of particular benefit when using easily oxidizable materials, for example photographic developer.

For a better understanding of the invention, reference will now be made, by way of example only, to the accompanying drawings in which:

DETAILED DESCRIPTION OF THE INVENTION

Figure 1:
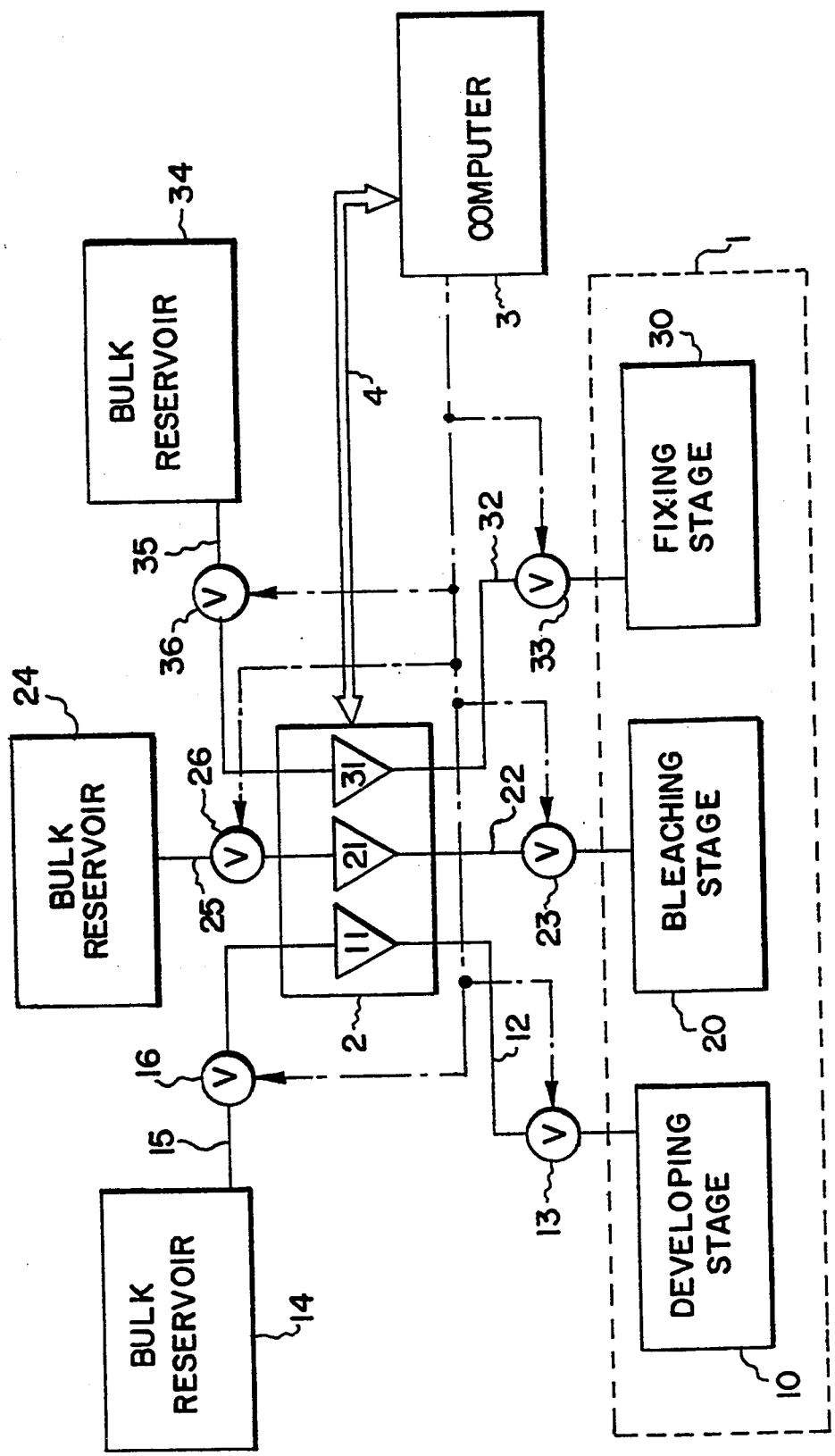
FIG. 1 shows a schematic block diagram of photographic processing apparatus according to the present invention.

In FIG. 1, a schematic block diagram of photographic processing apparatus according to the present invention, photographic processing apparatus is shown generally at 1. There are three stages in this apparatus, namely the developing stage 10, the bleaching stage 20, and the fixing stage 30. For replenishment of the chemistry at each stage, a weighing device 2 is provided. The device 2 has three intermediate containers 11, 21, and 31 supported on it, each intermediate container containing the necessary replenishment materials for its associated processing stage. Weighing device 2 serves to constantly monitor the weight of intermediate containers 11, 21, 31.

Each intermediate container 11, 21, 31 is connected to its processing stage 10, 20, 30, by means of respective pipelines 12, 22, 32. Each pipeline 12, 22, 32 is flexible and has a small bore. Respective ones of valves 13, 23, 33 are positioned in pipelines 12, 22, 32 to control the flow of replenishment material to the respective processing stations 10, 20, 30.

Intermediate containers 11, 21, 31 are refilled from bulk reservoirs 14, 24, 34 respectively by way of pipelines 15, 25, 35. Naturally, the sizes of the intermediate containers 11, 21, 31 are chosen to be appropriate to the size of the processing operation. Each pipeline has a refill valve 16, 26, 36 for controlling the supply of replenishment materials to the intermediate containers 11, 21, 31. The replenishment materials are gravity fed from the bulk reservoirs 14, 24, 34 to the intermediate containers 11, 21, 31.

Valves 13, 23, 33, 16, 26, 36 are all controlled by a computer 3 by means of connections shown as dot-dash lines in the figure. The computer 3 is interfaced with the weighing device 2 (as shown by connection 4). The decrement in the weight of the intermediate containers is monitored by the computer 3 so that the exact amount of replenishment material dispensed can be monitored.

A replenishment shot is achieved using the following steps:

a) The weighing device 2 is calibrated.

b) The first required replenishment shot is calculated and dispensed (using any necessary corrections to produce the most accurate shot).

Further replenishment shots are carried out in a similar manner. When all the required replenishment shots have been executed at any given time (from some or all of the intermediate containers as appropriate), each refill valve associated with each intermediate container from which material has been dispensed is operated to refill the container from its associated bulk reservoir. The computer 3 monitors the weight increase of the intermediate containers until there is no further increase indicating that the intermediate containers are full, and then shuts off each refill valve accordingly. This has the advantage of providing the refilling operation for the intermediate containers in the same operation as the dispensing operation.

Furthermore, because the intermediate containers are filled to capacity every time a replenishment shot is made, there is no risk of the container running out of replenishing material.

Moreover, errors are not accumulated. This means also that the tare weight at the start of a replenishment shot is near enough constant and this eliminates any problems which may occur due to the linearity of the weighing device used.

The intermediate containers 11, 21, 31 may consist of a solid container with a rolling diaphragm, or a flexible bag. The bag can be either in a box, or it can be suspended from a lightweight frame. In the described embodiment, the intermediate containers stand on the weighing device 2.

The computer 3 has software which comprises intelligent self-learning algorithms. These algorithms manage the replenishment of each of the processing stages 10, 20, 30.

There may be uncontrollable variables present in the replenishment system which may lead to variations in the quantities of the replenishment materials dispensed. Such variations can be allowed for in the computer software. The computer keeps track of these variations and in addition, can correct over- or under-replenishment of a previous replenishment shot. By analyzing the characteristics of each replenishment path, a systematic correction can be carried out by the computer prior to dispensing the replenishment shot. This has the result of reducing the error per replenishment shot. Furthermore, the cumulative error can be reduced to substantially zero.

The replenishment shot, as described above, commences with a calibration of the weighing device 2 and then the computer 3 monitors the current weight on the device 2 before calculating the end-weight value from the exact amount of replenishment material required and initiating the shot. As the replenishment material is dispensed, the computer 3 monitors the weight decrement and once the weight has dropped below the end-weight, then the shot is terminated. However, the accuracy and precision of the amount of replenishment material dispensed depends, to a certain extent, on the flow rate during dispensing of the shot and the maximum rate at which the computer 3 can perform weighings.

If the flow rate is high, then there are fewer weighings required during the shot and the precision falls. If the flow rate is low, therby giving good precision, the time taken per shot may be inconveniently long.

This problem may be overcome by utilizing time-interpolation techniques. Once one of the dispensing valves 13, 23, 33 has been opened, the shot will start to flow and after a very short time the flow rate will stabilize and remain constant. If the weighings carried out by the computer 3 are at strictly regular time intervals then the amount of the replenishment material dispensed during each time interval will be constant.

Figure 2:
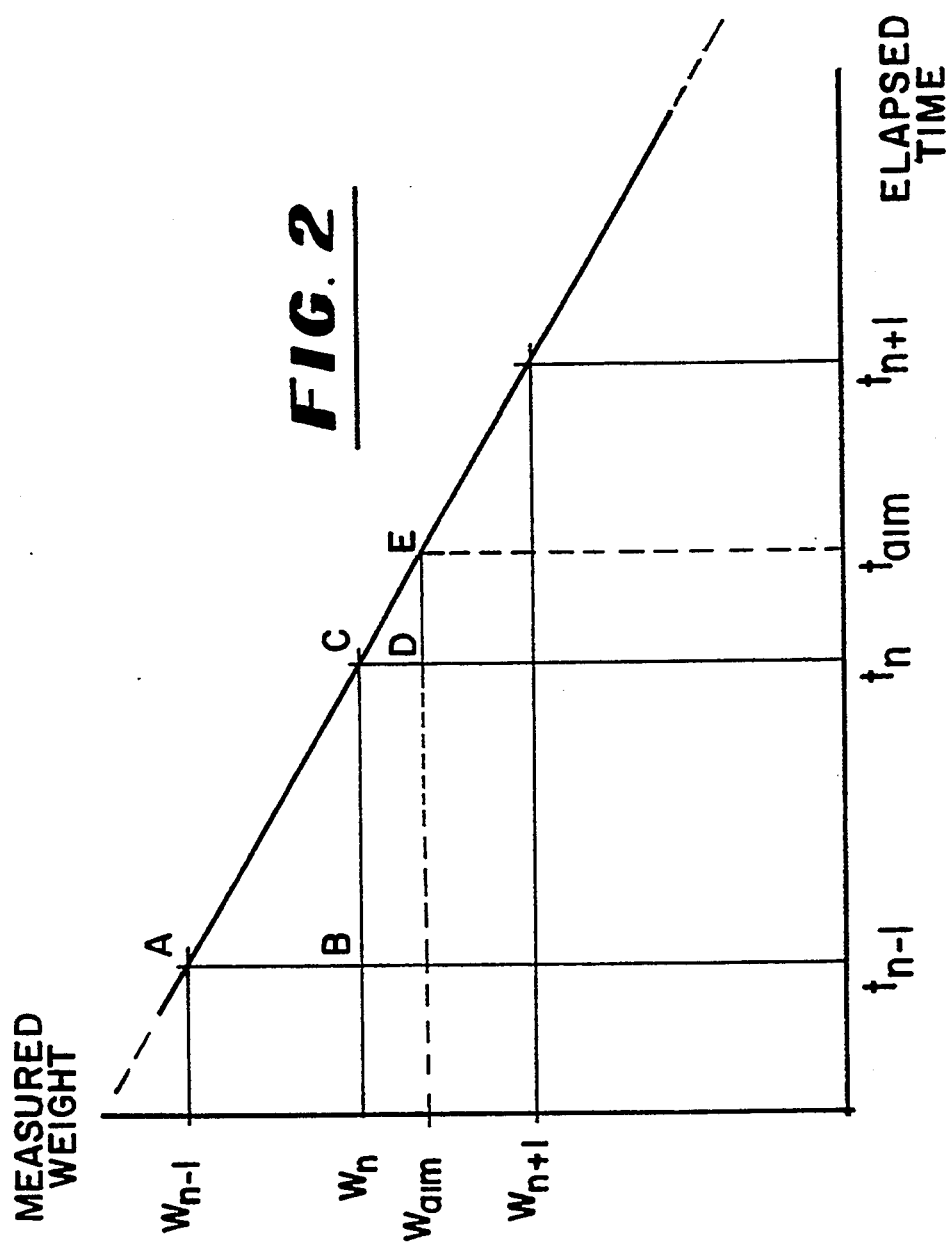
FIG. 2 is a graph showing measured weight against elapsed time for a constant flow rate.

FIG. 2 shows graphically the decrement of measured weight against elapsed time. If the flow rate is arranged to be constant, then triangles indicated by ABC and CDE are similar, and the following relationship holds:

$$AB/CD = BC/DE$$

Therefore, in terms of parameters on FIG. 2:

$$\frac{W_{n-1} - W_n}{W_n - W_{aim}} = \frac{t_n - t_{n-1}}{t_{aim} - t_n}$$

where $t_n$ is the time at which the nth shot is dispensed;

$t_{n-1}$ is the time at which the (n−1)th shot is dispensed;

$t_{aim}$ is the interval between dispensed shots;

$W_n$ is the weight at time $t_n$;

$W_{n-1}$ is the weight at time $t_{n-1}$; and $W_{aim}$ is the weight at time $t_{aim}$ Therefore, to determine $t_{aim}$ for a desired replenishment shot, $W_{aim}$:

$$t_{aim} = t_n + (t_n - t_{n-1}) \frac{(W_n - W_{aim})}{(W_{n-1} - W_n)}$$

As all of these values are readily available to the computer 3, and provided the time resolution is better than the time interval between weighings then an improvement in precision will result.

By way of example, in the system described above, the weighing interval was found to be about 400 ms. The time resolution of the computer was 5 ms so an improvement of up to 80 times was possible. This improvement can be realised by permitting a faster flow rate for a given precision or by improving the precision for an acceptable flow rate.

There may be inherent error in any system due to the accuracy and precision of the weighing device employed. If electronic scales are used as is preferred, this error can be minimized by good circuit design, selecting the most suitable load cell, and by arranging that the minimum replenishment shot is large compared with the resolution of the weighing device.

There may also be residual error from the most recent replenishment shot, but this should be small. It can be reduced by using small bore tubing which provides a flow rate which is small compared with the data acquisition rate of the computer software and the rate of operation of the valves.

Any imperfections in the valves 13, 23, 33, 16, 26, 36 can be compensated for by the computer 3.

Instead of having a valve in each pipeline, a single multi-way valve could be used to connect all the bulk reservoirs to their respective intermediate containers. This has the advantage that less valves are required and the cost of the apparatus is reduced.

Similar algorithms to those used for dispensing of the replenishment materials from the intermediate containers can be used to ensure that the intermediate containers are not emptied or overfilled.

Large bore tubing can be used for filling the intermediate containers as precision is not so important. Furthermore, it is desirable that the filling process is carried out as quickly as possible.

If the number of replenishment shots between refill cycles is kept small, then the absolute weight on the weighing device will not vary by much. This provides a good linearity of the weighing device over its entire range, and a single calibration point is all that is required.

The output from the weighing device can be digitised by a dual-slope integrating analogue to digital converter. Such a device makes about five conversions per second and automatically integrates out of the signal any short term noise of duration less than 250 ms. Quantization errors and digital noise are improved by the sampling and averaging processes contained in the computer software.

The system according to the present invention can be used in any size of operation. Only the intermediate containers and the weighing system need be selected for the scale of operation. The basic computer software is the same in each case regardless of the size of operation, with the exception of the necessity for changing the parameters which define the replenishment model from the particular operation.

In-line dilution can be used as several components can be dispensed from a single weighing device. The components can be solid or liquid form, and the sensitivity of the weighing device would be selected according to the required weights of the components.

An example of how a system according the present invention may operate is given below:

Consider a photographic process whose replenishment requirements for each 24-exposure 35 mm film are:

| Solution | Volume/ml |
|---|---|
| A | 20 |
| B | 10 |

| Solution | Volume/ml |
|---|---|
| C | 30 |

-continued

Assuming a scale of operation of five films per hour for eight hours a day at six days a week (a total of 240 films per week), then the replenishment requirements for a week's operation would be:

| Solution | Volume/l |
|---|---|
| A | 4.8 |
| B | 2.4 |
| C | 7.2 |

If these amounts were dispensed from reservoir containers directly which contained 5, 3, and 8 liters respectively, then a weighing device having a capacity of 16 kg would be required, the smallest quantity of the material being dispensed would be approximately 10 g. For an accuracy of 1% in the replenishment process, the weighing device would have to have an accuracy of 1 part in 160000, and as a consequence would be very expensive.

When using intermediate containers each having a capacity of 100 ml, the total solution weight would be approximately 300 g, and allowing for dead-weight for the containers and tubing etc, a weighing device having a capacity of 500 g could be used. The required accuracy would now be 1 part in 5000 which can be obtained from low cost commercial weighing devices.

Commercial low cost load-cells have a typical accuracy and linearity over their specified temperature scale of about 0.02% of full scale. This corresponds to 1 part in 5000 which matches the required accuracy.

By arranging for replenishment to take place after a number of films instead of after each film, the accuracy can be improved to better that 1%.

We claim:

1. A method of replenishing a photographic process comprising a plurality of different processing stages to maintain component concentration of each stage within specified limits, the method comprising the steps of:

monitoring the amount of material being processed;

determining the amount of replenishment material required to maintain the component concentrations in each stage;

dispensing one or more replenishment materials from one or more bulk reservoirs of replenishment material to a separate intermediate container for each replenishment material dispensed, wherein said intermediate container is operable to store smaller amounts of said replenishment material;

dispensing from said intermediate containers said required amount of replenishment material to the appropriate stage; and after each said dispensing and prior to dispensing further replenishment material, refilling said intermediate containers with replenishment material from bulk reservoirs containing each respective replenishment material;

characterized in that the amount of replenishment material dispensed to each stage is determined by weighing means, replenishment material for each processing stage being stored and dispensed separately.

2. A method according to claim 1 further including the step of calibrating the weighing means prior to dispensing of the replenishment material.

3. A method according to claim 1, wherein dispensing is terminated on the basis of a time interpolation algorithm.

4. Apparatus for use in a method according to claim 1, the apparatus comprising:

reservoir means for bulk storage of components comprising the replenishment material;

container means connected to the reservoir means and operable for storing smaller amounts of the components of the replenishment material;

weighing means for constantly monitoring the weight of the container means;

dispensing means for dispensing replenishment material from the container means; and control means for controlling the flow of the components from each container means to its associated stage and to refill the container means from the reservoir means prior to each replenishment process.

5. Apparatus according to claim 4, wherein the weighing means comprises a single weighing device on which all the containers are mounted.

6. Apparatus according to claim 4, wherein the control means includes a computer.

7. Apparatus according to claim 6, wherein the weighing means is interfaced with the computer.

8. Apparatus according to claim 7, wherein the computer is programmed with software including intelligent, self-learning algorithms to control replenishment.

9. Apparatus according to claim 4, wherein each container is a variable accumulator having tubing connecting it to its associated processing station.

* * * * *